(12) United States Patent
Kato et al.

(10) Patent No.: US 9,550,459 B2
(45) Date of Patent: Jan. 24, 2017

(54) CLIP

(71) Applicant: DAIWA KASEI KOGYO KABUSHIKI KAISHA, Okazaki-shi, Aichi-ken (JP)

(72) Inventors: Makoto Kato, Toyota (JP); Atsutoshi Kaji, Toyota (JP)

(73) Assignee: DAIWA KASEI KOGYO KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/678,808

(22) Filed: Apr. 3, 2015

(65) Prior Publication Data

US 2015/0298623 A1 Oct. 22, 2015

(30) Foreign Application Priority Data

Apr. 16, 2014 (JP) ................................. 2014-084454

(51) Int. Cl.
*B60R 13/02* (2006.01)
*F16B 5/06* (2006.01)
*F16B 21/08* (2006.01)

(52) U.S. Cl.
CPC .......... *B60R 13/0206* (2013.01); *F16B 5/065* (2013.01); *F16B 21/086* (2013.01)

(58) Field of Classification Search
CPC ....... F16B 5/0642; F16B 21/02; F16B 21/086; F16B 5/065; Y10T 24/42; Y10T 403/16; Y10T 403/7005; E05F 5/022; E05F 5/025
USPC ........................................... 24/458; 16/86 R
See application file for complete search history.

(56) References Cited

U.S. PATENT DOCUMENTS

| 4,762,437 | A | * | 8/1988 | Mitomi | ................... F16B 21/02 24/297 |
|---|---|---|---|---|---|
| 5,405,007 | A | * | 4/1995 | Iwahashi | ............ G11B 23/0233 206/268 |
| 6,435,790 | B1 | * | 8/2002 | Ichikawa | ............... F16B 5/0642 24/453 |
| 6,857,166 | B2 | * | 2/2005 | Nakagaki | ................ E05F 5/022 16/86 R |
| 7,566,081 | B2 | * | 7/2009 | Aoyama | .................. E05F 5/022 293/104 |
| 8,291,547 | B2 | * | 10/2012 | Ukai | ...................... F16B 21/086 16/86 R |
| 8,407,857 | B2 | * | 4/2013 | Sugiyama | ............... F16F 1/371 16/86 R |
| 2003/0088940 | A1 | * | 5/2003 | Nakagaki | ................ E05F 5/022 16/86 R |

(Continued)

FOREIGN PATENT DOCUMENTS

JP 2003-130110 A 5/2003

*Primary Examiner* — Robert J Sandy
*Assistant Examiner* — Rowland Do
(74) *Attorney, Agent, or Firm* — Christensen Fonder P.A.

(57) ABSTRACT

A clip may include an anchor made of a hard resinous material and having a pillar that is configured to be inserted into an attaching hole formed in a plate-shaped object member and elastic arms that are formed in the pillar and capable of flexing inward and outward with respect to the pillar, and cushions made of a soft resinous material. The elastic arms respectively have engagement claws respectively having engagement surfaces that are configured to engage an inner periphery of the attaching hole. The engagement surfaces are respectively covered by the cushions.

7 Claims, 11 Drawing Sheets

(56) References Cited

U.S. PATENT DOCUMENTS

| | | | | |
|---|---|---|---|---|
| 2007/0234527 A1* | 10/2007 | Aoyama | ............... | E05F 5/022 24/297 |
| 2010/0192335 A1* | 8/2010 | Ukai | ............... | F16F 1/373 24/591.1 |
| 2011/0030177 A1* | 2/2011 | Ukai | ............... | F16B 21/086 24/458 |
| 2011/0167590 A1* | 7/2011 | Ukai | ............... | E05F 5/022 16/85 |
| 2011/0247714 A1* | 10/2011 | Kanao | ............... | B32B 1/08 138/137 |
| 2012/0246896 A1* | 10/2012 | Kaji | ............... | E05F 5/022 24/682.1 |
| 2014/0196261 A1* | 7/2014 | Kamiya | ............... | E05F 5/022 24/591.1 |

* cited by examiner

FIG. 13

CLIP

BACKGROUND OF THE INVENTION

Field of the Invention

The present invention relates to a clip for a vehicle. More particularly, the present invention relates to a clip that is configured to be attached to a plate-shaped object member (e.g. a door inner panel of a vehicle).

Description of Related Art

An example of clips that are configured to be attached to a plate-shaped object member (e.g., a door inner panel of a vehicle) is taught by, for example, JP2003-130110A. The clip is known as a cushion clip and includes an anchor having a pair of elastic arms and a shock-absorbing or cushioning body integrally connected to the anchor. The anchor is configured to be inserted into an attaching hole formed in the object member. The anchor and the cushioning body are respectively made of polypropylene or other such hard materials and an elastomer or other such soft materials.

When the anchor is pushed into the attaching hole of the object member, the anchor can be introduced into the attaching hole while the elastic arms are flexed inward. When the anchor is completely introduced into the attaching hole, the elastic arms can engage a periphery of the attaching hole. Thus, the clip can be attached to the object member. The clip attached to the object member may function to absorb impact from an opposite member (e.g., a body panel of the vehicle) that is capable of relatively moving toward and away from the object member. In particular, when the object member and the opposite member move closer to each other, the cushioning body of the clip may contact the opposite member, so as to absorb the impact from the opposite member.

Further, the cushioning body of the clip taught by JP2003-130110A has a boss portion that is continuously projected from a bottom surface thereof. The boss portion is shaped to contact an inner circumferential surface of the attaching hole of the object member when the clip is attached to the object member by inserting the anchor into the attaching hole. Therefore, in a condition in which the clip is attached to the object member, the boss portion may function to prevent the water (rainwater), dust or other such substances from entering an interior side of the object member through the attaching hole.

Generally, the object member may have variations in thickness. Also, the attaching hole formed in the object member may have variations in diameter that are caused by burrs formed around the attaching hole or coating defects called "fat edges." Therefore, when the anchor is inserted into the attaching hole, the elastic arms cannot properly engage the periphery of the attaching hole. Further, backlash or looseness can be formed between the elastic arms and the attaching hole in some situations.

In order to prevent such disadvantages, the whole clip (both of the anchor and the cushioning body) can be made of soft elastic materials in order to absorb the variations in thickness of the object member and/or the variations in diameter of the attaching hole due to elasticity thereof. However, in such a clip, when the anchor is inserted into the attaching hole, an anchor insertion resistance can be increased. In other words, in the clip, when the anchor is inserted into the attaching hole, an anchor insertion load (force) may be increased in comparison with the clip of which the anchor is made of polypropylene. As a result, working efficiency of a clip insertion operation can be reduced. Thus, there is a need in the art for improved clip.

BRIEF SUMMARY OF THE INVENTION

For example, one aspect of the present invention may provide a clip which may include an anchor made of a hard resinous material and having a pillar that is configured to be inserted into an attaching hole formed in a plate-shaped object member and elastic arms that are formed in the pillar and capable of flexing inward and outward with respect to the pillar, and cushions made of a soft resinous material, wherein the elastic arms respectively have engagement claws respectively having engagement surfaces that are configured to engage an inner periphery of the attaching hole, and wherein the engagement surfaces are respectively covered by the cushions.

According to one aspect of the invention, even when the object member has variations in thickness, such variations can be absorbed by elasticity of the cushions. Further, even when the attaching hole has variations in diameter caused by burrs formed therearound, such variations can be absorbed by elasticity of the cushions. Therefore, when the pillar of the anchor is inserted into the attaching hole, the engagement claws of the elastic arms can properly engage the inner periphery of the attaching hole. As a result, the anchor (the clip) can be securely and stably connected to the object member.

Optionally, the clip may further include additional cushions made of the soft resinous material, wherein an outer surface of the pillar is partially covered by the additional cushions.

Further, the clip may further include a cushioning body made of the soft resinous material and integrally connected to the anchor, wherein the cushions and additional cushions are integrally formed with the cushioning body.

Further, the anchor may have a base integrally connected to a proximal end of the pillar, wherein the cushioning body is integrally connected to the anchor while the base is embedded in the cushioning body.

Other plate-shaped object members, features and advantages of the present invention will be readily understood after reading the following detailed description together with the accompanying drawings and the claims.

DETAILED DESCRIPTION OF THE INVENTION

Detailed representative embodiments of the present invention are shown in FIGS. 1 to 13.
First Embodiment
A first detailed representative embodiment of the present invention will be described with reference to FIGS. 1 to 9. In the following description, a door inner panel 50 of a vehicle door and a body panel 54 of a vehicle body are exemplified as two (first and second) members that are capable of relatively moving toward and away from each other. Further, the door inner panel 50 of the vehicle door may be referred to as "a plate-shaped object member." Conversely, the body panel 54 of the vehicle body may be referred to as "an opposite member."

Figure 8:
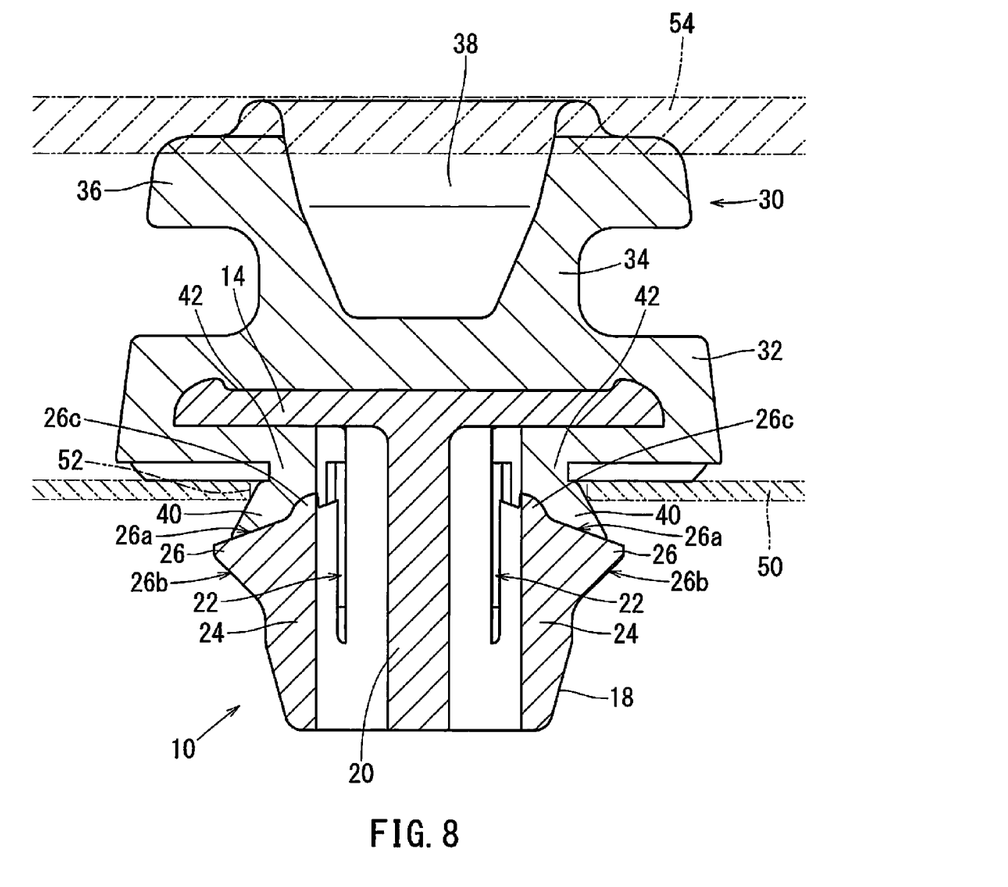
FIG. 8 is a cross-sectional view taken along line VIII-VIII in FIG. 6, in which a plate-shaped object member and an opposite member are added.
Figure 9:
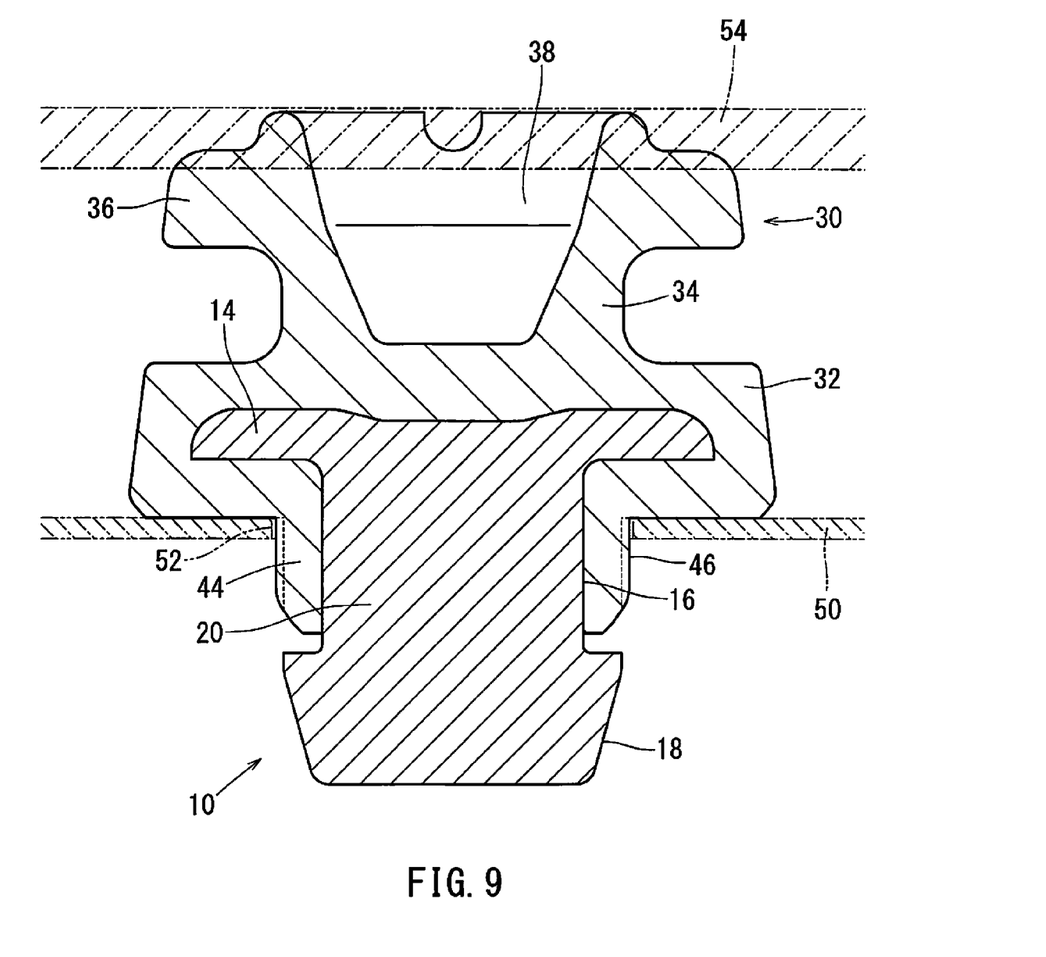
FIG. 9 is a cross-sectional view taken along line IX-IX in FIG. 5, in which the object member and the opposite member are added.

A first representative clip 1 shown therein may be formed as a shock-absorbing or cushioning clip and configured to be attached to the door inner panel 50 in order to absorb impact from the body panel 54 when the door inner panel 50 and the body panel 54 move closer to each other. As shown in FIGS. 1, 2, 5 and 6, the clip 1 may include an anchor 10 and a cushioning body 30. The anchor 10 may be configured to be connected to the door inner panel 50 (FIGS. 8 and 9). The cushioning body 30 may be configured to contact the body panel 54 (FIGS. 8 and 9) and to elastically deform when the door inner panel 50 and the body panel 54 move closer to each other. The anchor 10 may preferably be made of a hard resinous material, e.g., polypropylene (PP). Conversely, the cushioning body 30 may preferably be made of a soft elastic material, e.g., a thermoplastic elastomer (TPE).

The clip 1 (the anchor 10 and the cushioning body 30) may preferably be integrally formed by two-color molding of the hard resinous material and the soft elastic material. In particular, the anchor 10 may be previously integrally formed by injection molding. Thereafter, the cushioning body 30 may be integrally formed on the anchor 10. Thus, the clip 1 can be integrally formed as a unit.

Figure 3:
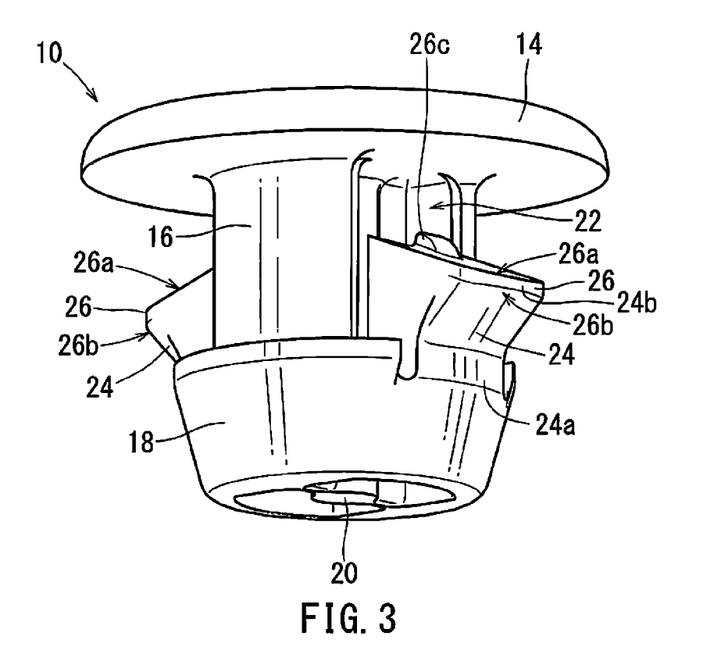
FIG. 3 is a perspective view of an anchor of the clip, which is viewed from the frontal side.
Figure 4:
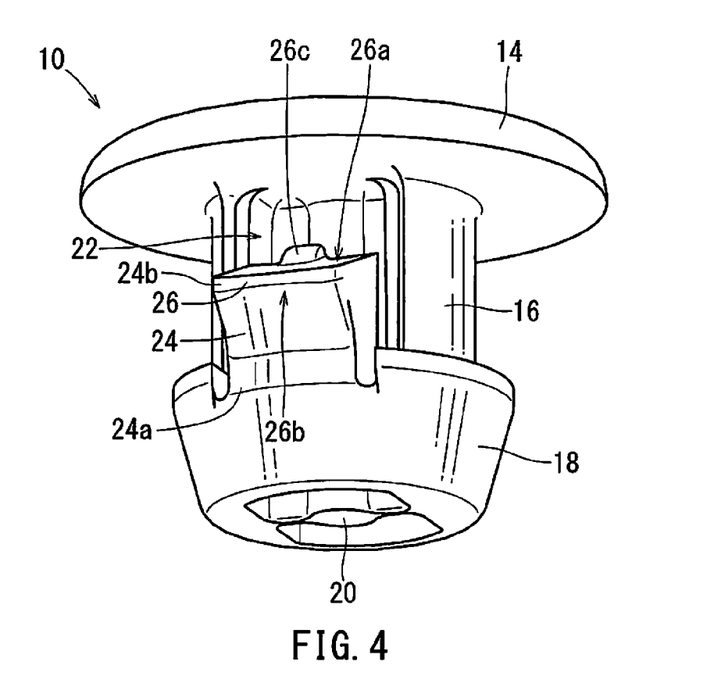
FIG. 4 is a perspective view of the anchor of the clip, which is viewed from the lateral side.
Figure 5:
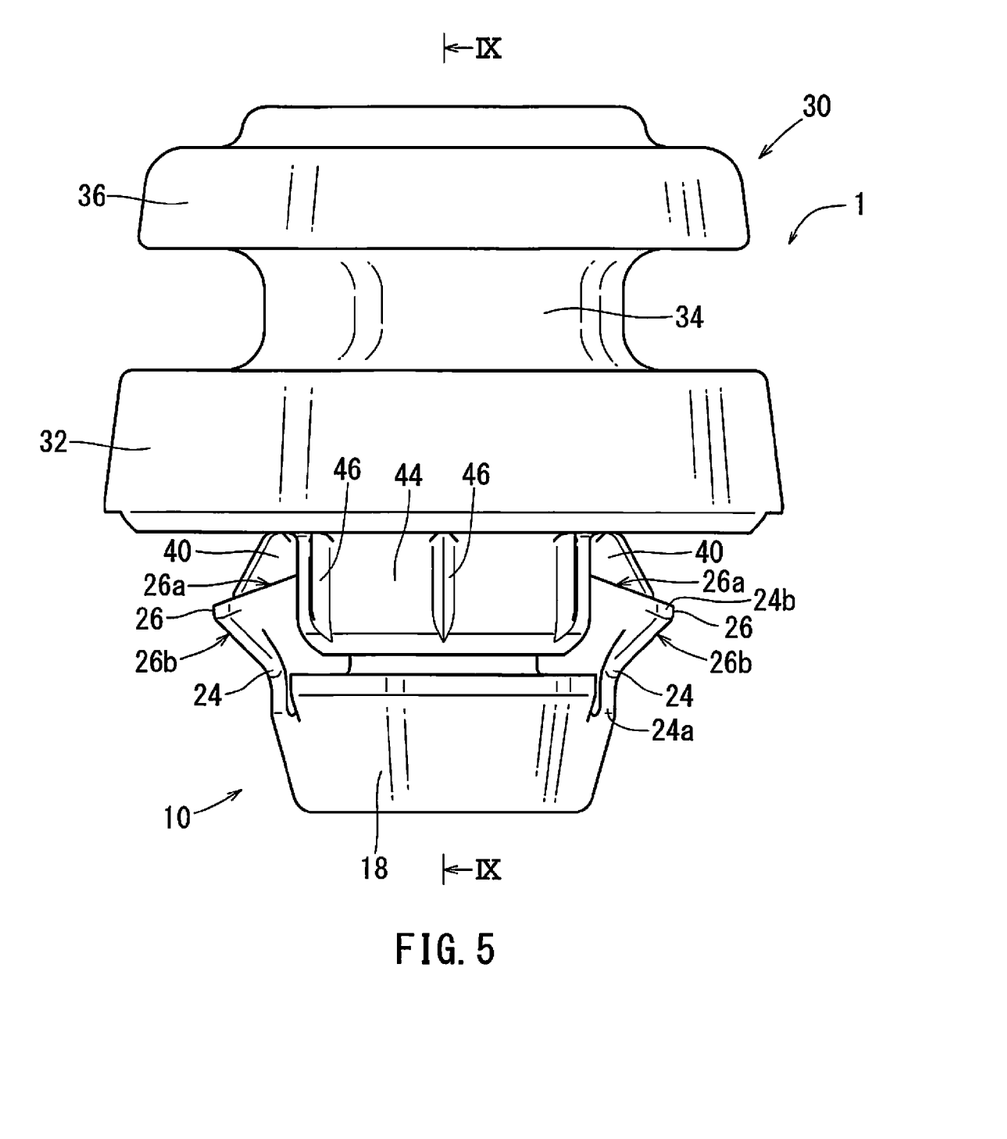
FIG. 5 is an elevational view of the clip.
Figure 6:
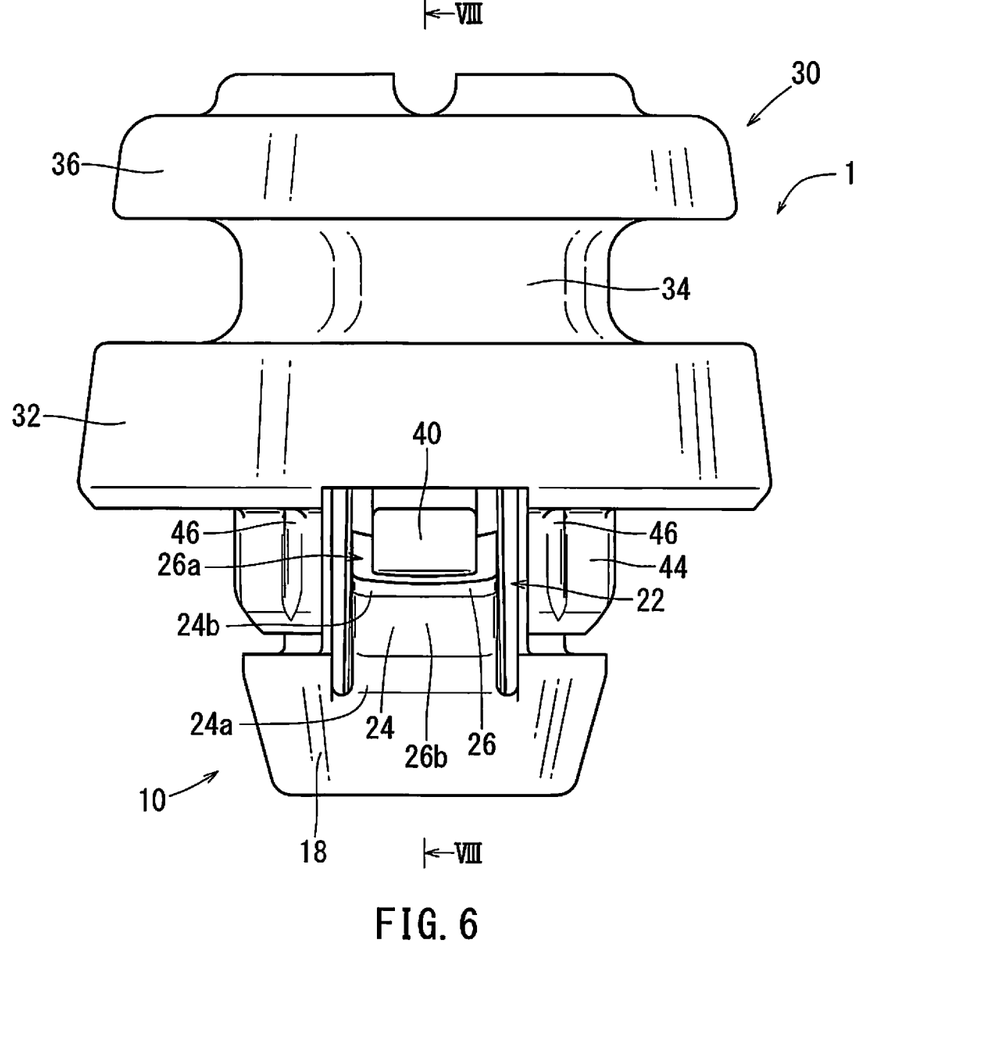
FIG. 6 is a side view of the clip.

As shown in FIGS. 3 and 4, the anchor 10 may include an enlarged disk-shaped base 14, a pillar 16 projected from a central portion of one surface of the base 14, and a pair of cantilevered elastic arms 24 that are laterally oppositely formed in both sides of the pillar 16. The base 14 may be embedded in the cushioning body 30 so as to reliably connect the anchor 10 and the cushioning body 30. That is, the base 14 may function as a connecting portion capable of increasing a connecting force between the anchor 10 and the cushioning body 30. The pillar 16 may be configured to be inserted into an attaching hole 52 formed in the door inner panel 50 (FIGS. 8 and 9) along with the elastic arms 24. Further, the pillar 16 may have a truncated cone-shaped head portion 18 formed in a distal end thereof, so as to be easily inserted into the attaching hole 52. The elastic arms 24 may preferably be oppositely positioned across the pillar 16 and respectively connected to the head portion 18 of the pillar 16 at proximal end portions 24a thereof. Therefore, the elastic arms 24 can be flexed inward and outward with respect to the pillar 16 about the proximal end portions 24a thereof due to elasticity of the resinous material.

Figure 7:
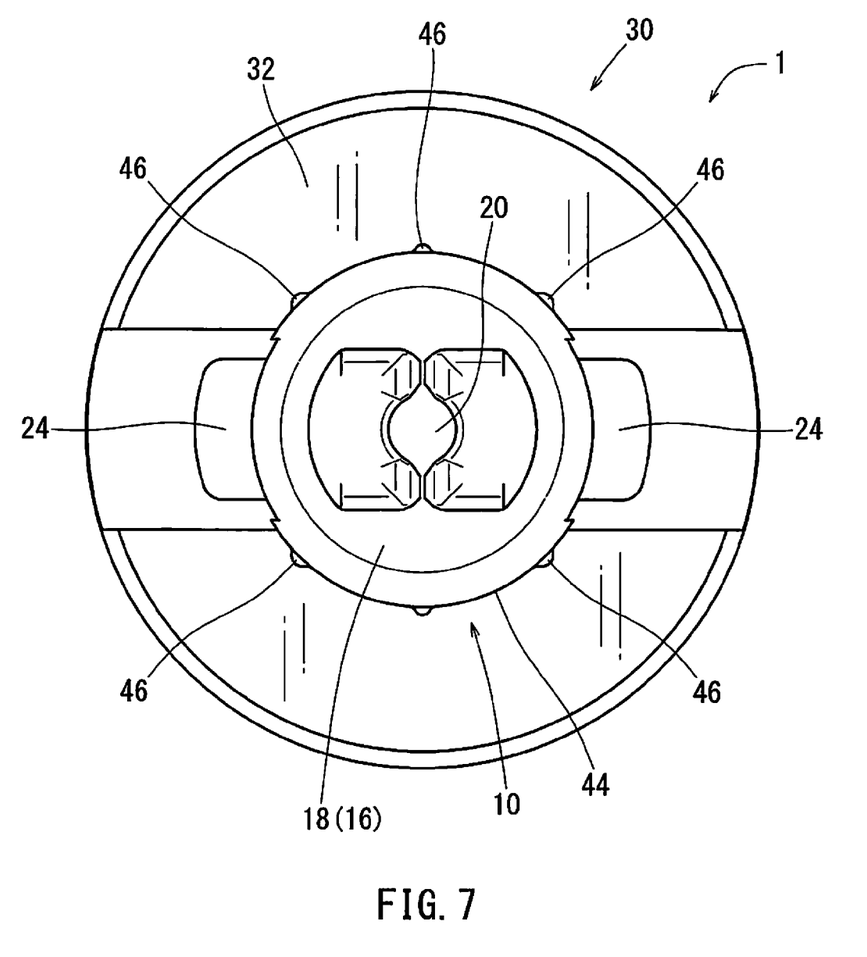
FIG. 7 is a bottom view of the clip.

As shown in FIGS. 3, 4 and 7, the pillar 16 may preferably be formed as an open-ended hollow member having an elongated reinforcement portion 20 formed therein. In particular, an interior space of the pillar 16 may open in an end surface of the head portion 18. Further, the reinforcement portion 20 may preferably be positioned on a central axis of the pillar 16 and extend over the entire length of the pillar 16. Further, the pillar 16 may have a pair of side openings 22 formed therein and communicated with the interior space thereof. The side openings 22 may respectively be positioned opposite to the elastic arms 24. Further, the side openings 22 may respectively be shaped such that the elastic arms 24 can be flexed inward and outward via the side openings 22.

As shown in FIGS. 3 and 4, the elastic arms 24 may respectively have engagement claws 26 formed in distal (free) end portions 24b thereof and bulged outward. The engagement claws 26 may respectively have engagement surfaces 26a that obliquely face the base 14 and inclined surfaces 26b that are positioned on opposite sides of the engagement surfaces 26a and angled with respect to the engagement surfaces 26a. As will be recognized, each of the engagement surfaces 26a may preferably be shaped so as to be flush with an end surface of each of the distal end portions 24b of the elastic arms 24. That is, each of the engagement surfaces 26a may be formed as a portion of the end surface of each of the distal end portions 24b of the elastic arms 24. Further, the elastic arms 24 may have projections 26c that are respectively formed in the engagement surfaces 26a (the end surfaces of the distal end portions 24b).

Figure 1:
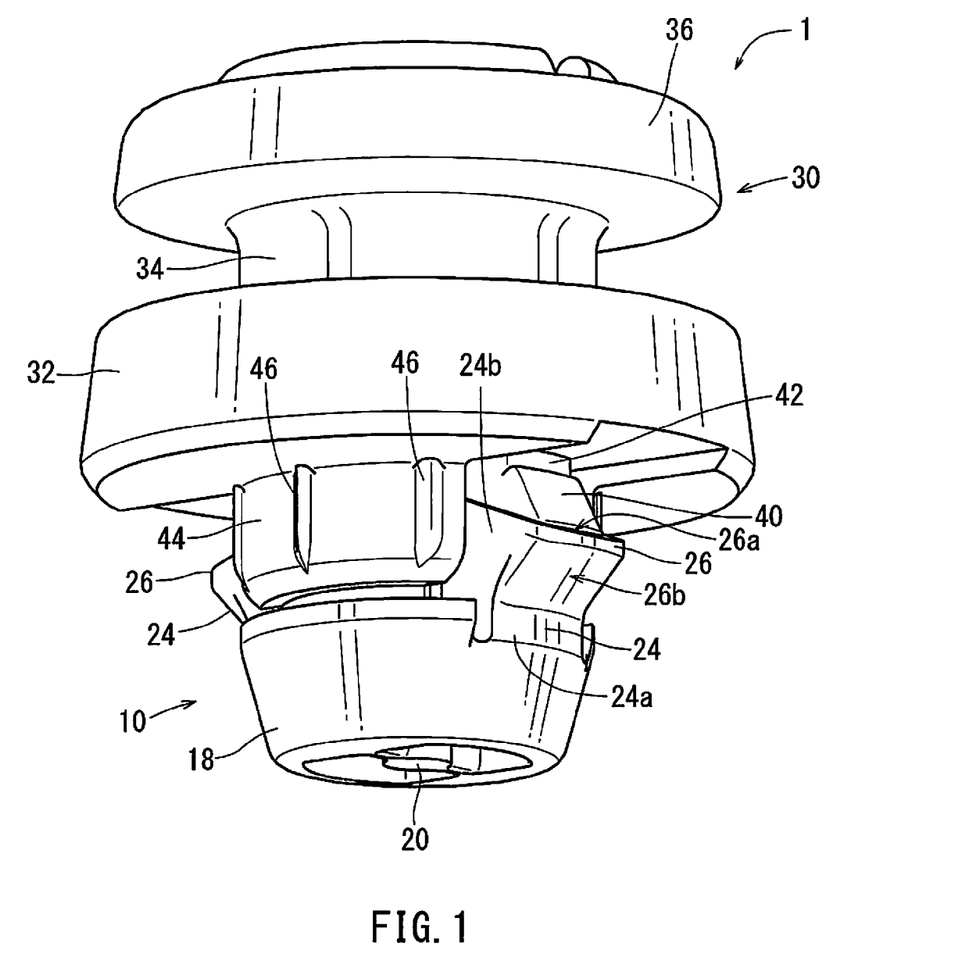
FIG. 1 is a perspective view of a shock-absorbing clip according to a first representative embodiment of the present invention, which is viewed from a frontal side.
Figure 2:
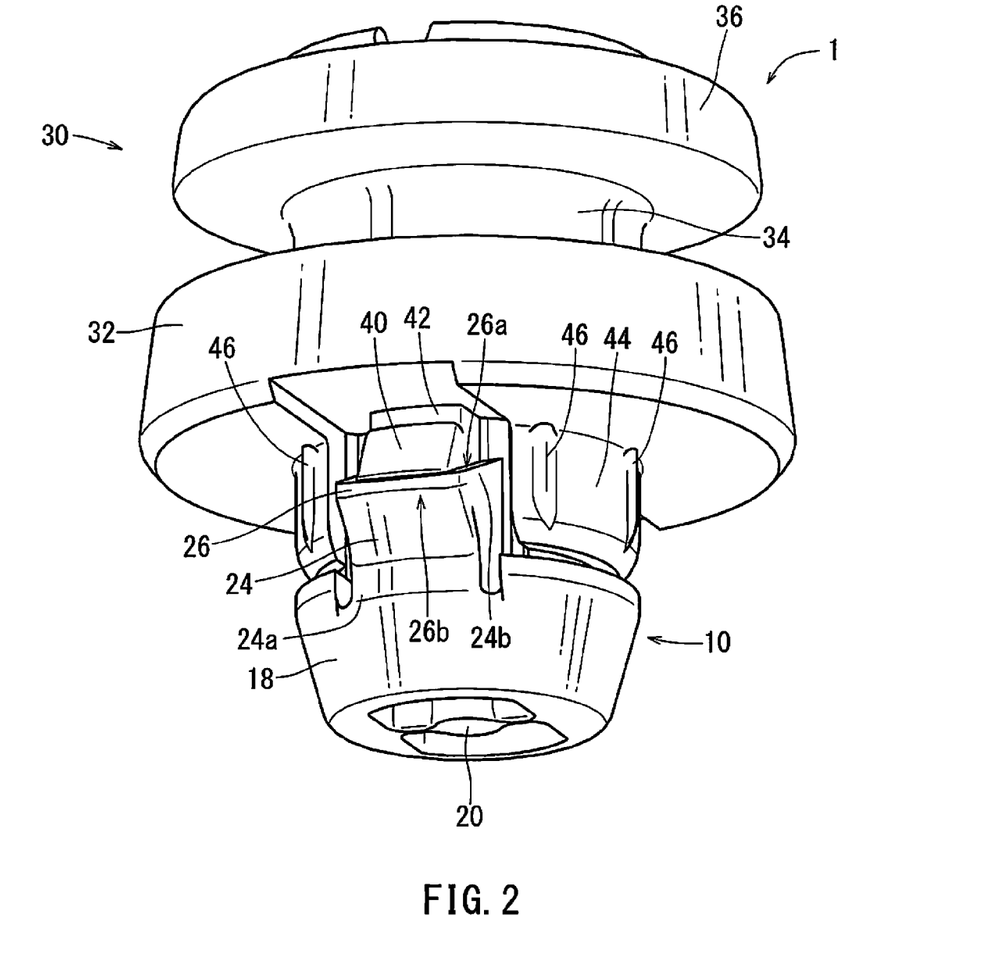
FIG. 2 is a perspective view of the clip, which is viewed from a lateral side.

As shown in FIGS. 1 and 2, the cushioning body 30 may be integrally formed on the anchor 10. The cushioning body 30 may include a thickened disk-shaped base portion 32, a thickened disk-shaped top portion 36 and a pillar-shaped neck portion 34 positioned between the base portion 32 and the top portion 36. As shown in FIGS. 8 and 9, the base portion 32 may be connected to the base 14 of the anchor 10 while the base 14 is embedded therein. Further, the cushioning body 30 may have an open-ended central cavity 38 formed in the top portion 36 and the neck portion 34. The cavity 38 may substantially penetrate the top portion 36 and the neck portion 34 and may open in an end surface of the top portion 36. Due to the cavity 38, when an impact load is applied to the cushioning body 30, the top portion 36 and the neck portion 34 may be easily and smoothly elastically deformed, so as to effectively absorb the load.

The cushioning body 30 may further include additional cushioning portions 40 and 44. As shown in FIG. 8, the cushioning portions 40 (which may be referred to as "cushions") may cover the engagement surfaces 26a of the engagement claws 26 formed in the elastic arms 24. Conversely, as shown in FIG. 9, the cushioning portions 44 (which may be referred to as "additional cushions") may cover a substantial portion of an outer circumferential surface of the pillar 16 except for the side openings 22 and the head portion 18. The cushioning portions 40 and 44 may respectively be continuously integrally formed with the base portion 32. That is, the cushioning portions 40 and 44 may simultaneously be formed when the cushioning body 30 is formed on the anchor 10 by the two-color molding. Therefore, the cushioning portions 40 can be integrally connected or bonded to the engagement surfaces 26a of the engagement claws 26. Similarly, the cushioning portions 44 can be integrally connected or bonded to the substantial portion of the outer circumferential surface of the pillar 16.

As shown in FIGS. 1, 2, 5 and 8, the cushioning portions 40 covering the engagement surfaces 26a of the engagement claws 26 may be continuous with the base portion 32 of the cushioning body 30 via transition portions 42. Further, each of the transition portions 42 may preferably have an appropriate thickness such that each of the elastic arms 24 cannot be prevented from being flexed inward and outward with respect to the pillar 16.

Further, as described above, the cushioning portions 40 may be simply bonded to the engagement surfaces 26a of the engagement claws 26. However, when the cushioning portions 40 are formed on the engagement surfaces 26a, the projections 26c formed in the engagement surfaces 26a can be embedded in the cushioning portion 40. Therefore, connecting forces between the cushioning portions 40 and engagement surfaces 26a can be effectively increased. Further, an outer surface of each of the cushioning portions 40 may preferably be inclined at a given angle in the same direction as each of the engagement surfaces 26a such that each of the cushioning portions 26a may have a wedge-shape in cross section.

As shown in FIGS. 1, 2, 6 and 9, each of the cushioning portions 44 may be circumferentially continuously formed along the outer circumferential surface of the pillar 16 except for the side openings 22. Each of the cushioning portions 44 may have a plurality of (three in this embodiment) ribs 46 formed in an outer surface thereof. The ribs 46 may preferably extend along an axis of the pillar 16. Further, the ribs 46 may preferably be circumferentially positioned along the outer surface of each of the cushioning portions 44 at certain intervals.

Next, an operation of the clip 1 thus constructed will now be described in detail with reference to FIGS. 8 and 9.

In order to attach the clip 1 to the door inner panel 50, the pillar 16 (the anchor 10) may be pressed into the attaching hole 52 formed in the door inner panel 50. As a result, the pillar 16 can be introduced into the attaching hole 52 while the elastic arms 24 are elastically flexed inward by the contact of the inclined surfaces 26b of the engagement claws 26 with an inner periphery of the attachment hole 52. When the pillar 16 is completely inserted into the attaching hole 52, i.e., when the pillar 16 is inserted into the attaching hole 52 until the base portion 32 of the cushioning body 30 contacts the door inner panel 50, the elastic arms 24 can pass through the attaching hole 52, so as to be elastically restored or spread outward. As a result, the engagement surfaces 26a of the engagement claws 26 can elastically engage the inner periphery of the attaching hole 52 of the door inner panel 50 via the cushioning portions 40 covering the engagement surfaces 26a (FIG. 8), so that the anchor 10 can be connected to the door inner panel 50. At this time, the ribs 46 formed in the cushioning portions 44 covering the outer circumferential surface of the pillar 16 may elastically contact an inner circumferential surface of the attaching hole 52 (FIG. 9). Thus, the clip 1 can be attached to the door inner panel 50.

According to the embodiment, as described above, the engagement surfaces 26a of the engagement claws 26 can respectively elastically engage the inner periphery of the attaching hole 52 of the door inner panel 50 with interleaving the cushioning portions 40 therebetween. Therefore, even when the door inner panel 50 has variations in thickness, such variations can be absorbed by elasticity (elastic deformation) of the cushioning portions 40. Further, even when the attaching hole 52 has variations in diameter caused by burrs formed therearound, such variations can be absorbed by elasticity of the cushioning portions 40. Therefore, when the pillar 16 of the anchor 10 is inserted into the attaching hole 52, the engagement claws 26 can properly and stably engage the inner periphery of the attaching hole 52. As a result, the anchor 10 can be securely and stably connected to the door inner panel 50. Thus, the clip 1 can be reliably attached to the door inner panel 50.

Further, a substantial portion of the anchor 10 made of the hard resinous material may be uncovered except for the engagement surfaces 26a of the engagement claws 26 covered by the cushioning portions 40 and the outer circumferential surface of the pillar 16 covered by the cushioning portions 44. In particular, the head portion 18 of the pillar 16 and substantial portions of the elastic arms 24 including the inclined surfaces 26b of the engagement claws 26 may be uncovered. That is, in the head portion 18 of the pillar 16 and the substantial portions of the elastic arms 24, the hard resinous material may be exposed or bared. Therefore, when the pillar 16 of the anchor 10 is inserted into the attaching hole 52 formed in the door inner panel 50, a frictional resistance generated between the head portion 18 of the pillar 16 and the inner periphery of the attaching hole 52 and between the elastic arms 24 (the inclined surfaces 26b of the engagement claws 26) and the inner periphery of the attaching hole 52 can be prevented from being increased. As a result, an insertion load of the pillar 16 (the anchor 10) can be prevented from being increased.

When the vehicle door is closed in a condition in which the shock-absorbing clip 1 is attached to the door inner panel 50, the door inner panel 50 can move toward the body panel 54 of the vehicle body. As a result, the cushioning body 30 of the clip 1 may contact the body panel 54, so as to be elastically deformed. Thus, the impact from the body panel 54 (the vehicle body) can be absorbed. Further, when the vehicle door is closed, the door inner panel 50 and the body panel 54 may have a positional relationship shown in FIGS. 8 and 9. Therefore, when the vehicle door is closed, the cushioning body 30 (mainly the top portion 36 and the neck portion 34) can be compressed and elastically deformed by an amount equal to a portion that is overlapped with the body panel 54 in FIGS. 8 and 9.

Generally, in a condition in which the vehicle door is closed, the door inner panel 50 and body panel 54 may move relative to each other due to vibration caused by vehicle running motion. As a result, the anchor 10 may move within the attaching hole 52 with the cushioning body 30 compressed between the door inner panel 50 and the body panel 54. However, as described above, in a condition in which the anchor 10 is connected to the door inner panel 50, the cushioning portions 40 covering the engagement surfaces 26a of the engagement claws 26 may elastically contact the inner periphery of the attaching hole 52 of the door inner panel 50 (FIG. 8). In addition, the ribs 46 of the cushioning portions 44 covering the outer circumferential surface of the pillar 16 may elastically contact the inner circumferential surface of the attaching hole 52 (FIG. 9). Therefore, even when the door inner panel 50 and body panel 54 move relative to each other, the anchor 10 can be effectively prevented from moving within the attaching hole 52 by elasticity of the cushioning portions 40 and 44. This may prevent generation of noise between the anchor 10 and the inner circumferential surface of the attaching hole 52.

As previously described, the cushioning portions 40 covering the engagement surfaces 26a of the engagement claws 26 formed in the elastic arms 24 may be integrally connected to the base portion 32 of the cushioning body 30 via the transition portions 42. Further, the thickness of each of the transition portions 42 may be set such that each of the elastic arms 24 cannot be prevented from being flexed inward and outward with respect to the pillar 16. As a result, a function of the elastic arm 24 cannot be obstructed by the transition portions 42. In particular, when the pillar 16 of the anchor 10 is inserted into the attaching hole 52 formed in the door inner panel 50, the elastic arms 24 can be smoothly elastically flexed inward. In addition, when the pillar 16 is completely inserted into the attaching hole 52, the elastic arms 24 can be surely elastically restored outward. Therefore, upon insertion of the pillar 16 into the attaching hole 52, the anchor 10 can be securely connected to the door inner panel 50 via the elastic arms 24.

Second Embodiment

The second detailed representative embodiment will now be described in detail with reference to FIGS. 10 to 12. Further, in the following description, a body panel (not shown)" of a vehicle body is exemplified as "a plate-shaped object member." Conversely, a wiring harness (not shown) is exemplified as "an attaching article."

Unlike the clip 1 of the first embodiment, a second representative clip 101 shown therein may be configured to be attached to the body panel in order to attach the wiring harness to the body panel. As shown in FIGS. 10 to 12, the clip 101 may include an anchor 110 and cushioning members 140 (which may be referred to as "cushions") attached to the anchor 110. The anchor 110 may be configured to be connected to the body panel. Similar to the anchor 10 of the first embodiment, the anchor 110 may preferably be made of a hard resinous material, e.g., polypropylene (PP). Conversely, the cushioning members 140 may preferably be made of a soft elastic material, e.g., a thermoplastic elastomer (TPE). Further, similar to the clip 1 of the first embodiment, the clip 101 (the anchor 110 and the cushioning members 140) may preferably be integrally formed by two-color molding of the hard resinous material and the soft elastic material. However, the cushioning members 140 can be separately formed and then be adhered to the anchor 110 in order to from the clip 101.

Figure 10:
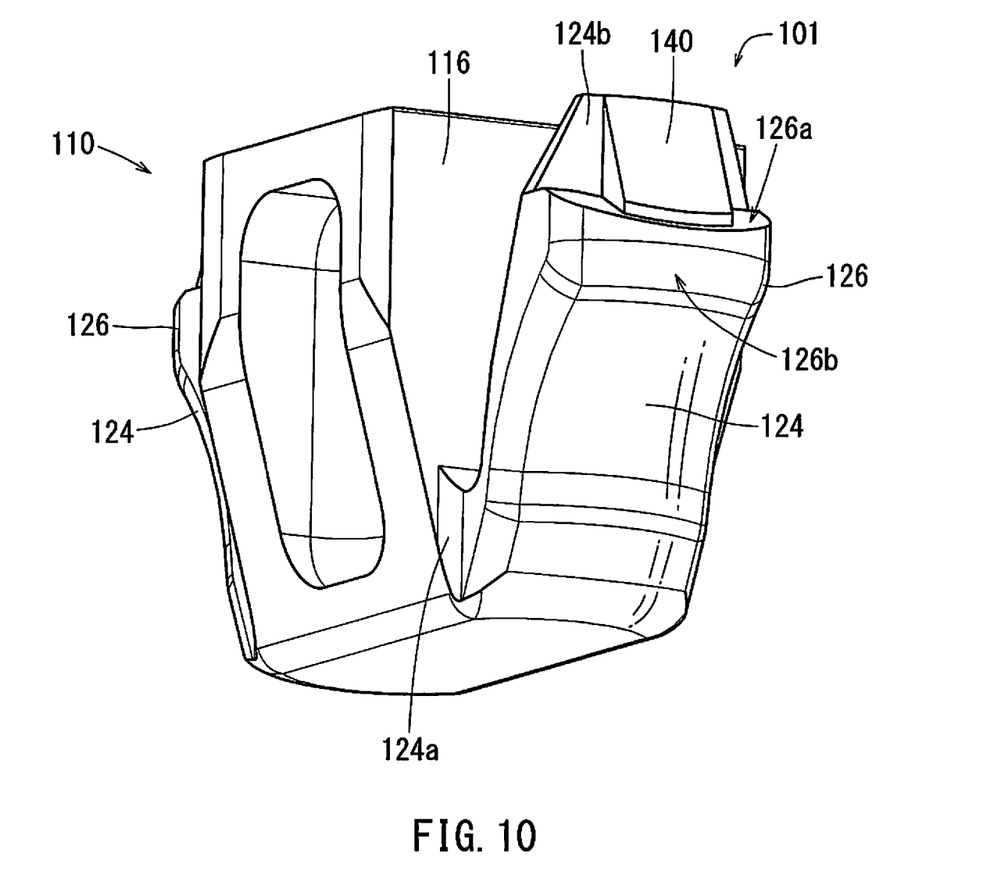
FIG. 10 is a perspective view of a clip according to a second representative embodiment of the present invention.
Figure 11:
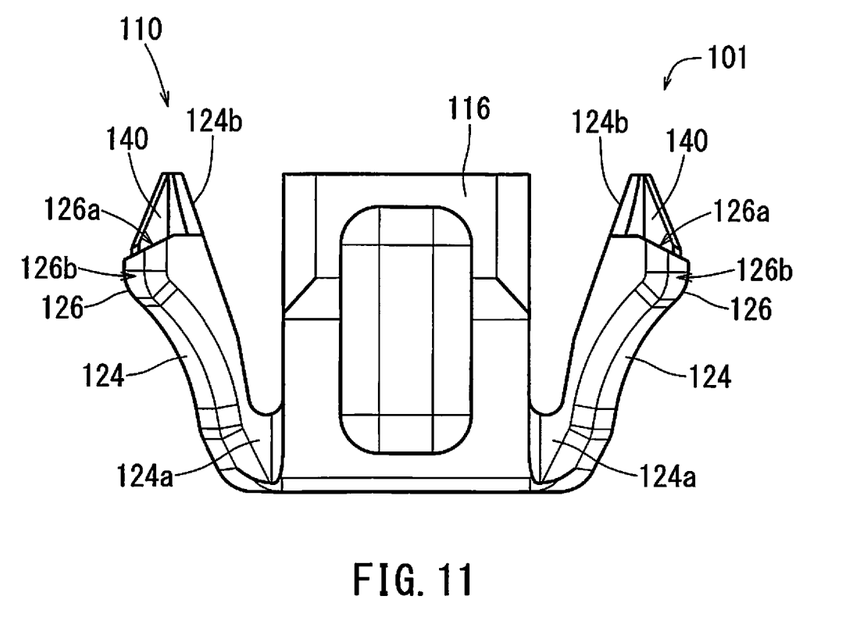
FIG. 11 is an elevational view of the clip.
Figure 12:
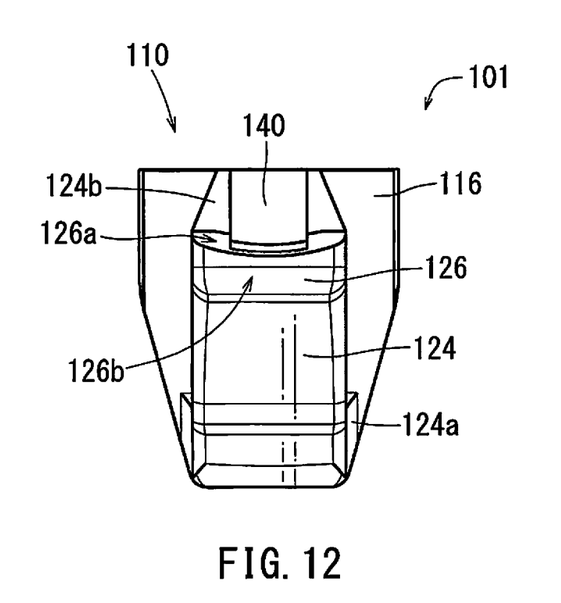
FIG. 12 is a side view of the clip.

As shown in FIGS. 10 to 12, the anchor 110 may include a rectangular columnar pillar 116 and a pair of cantilevered elastic arms 124 that are laterally oppositely formed in both sides of the pillar 116. The pillar 116 may be configured to be inserted into an attaching hole (not shown) formed in the body panel along with the elastic arms 124. The elastic arms 124 may preferably be oppositely positioned across the pillar 116 and respectively connected to a distal end of the pillar 116 at proximal end portions 124*a* thereof. Therefore, the elastic arms 124 can be flexed inward and outward with respect to the pillar 116 about the proximal end portions 124*a* thereof due to elasticity of the resinous material.

As shown in FIGS. 10 to 12, the elastic arms 124 may respectively have engagement claws 126 formed in portions adjacent to distal (free) end portions 124*b* thereof and bulged outward. The engagement claws 126 may respectively have engagement surfaces 126*a* that are positioned adjacent to the distal end portions 124*b* of the elastic arms 124 and inclined surfaces 126*b* that are positioned on opposite sides of the engagement surfaces 126*a* and angled with respect to the engagement surfaces 126*a*. As will be recognized, each of the engagement surfaces 126*a* may be formed by partially removing each of the distal end portions 124*b* of the elastic arms 124. That is, each of the engagement surfaces 126*a* may be formed as a shouldered surface formed in each of the distal end portions 124*b* of the elastic arms 124.

The cushioning members 140 may respectively be attached to the elastic arms 124 so as to substantially cover the engagement surfaces 126*a* of the engagement claws 126 and outer surfaces of the distal end portions 124*b* of the elastic arms 124 continuous with the engagement surfaces 126*a*.

Next, an operation of the clip 101 thus constructed will now be described in detail.

In order to attach the clip 101 to the body panel (not shown), the pillar 116 of the anchor 110 may be pressed into the attaching hole (not shown) formed in the body panel. As a result, the pillar 116 can be introduced into the attaching hole while the elastic arms 124 are elastically flexed inward by the contact of the inclined surfaces 126*b* of the engagement claws 26 with an inner periphery of the attachment hole. When the pillar 116 is completely inserted into the attaching hole, i.e., when the pillar 116 is inserted into the attaching hole by a predetermined distance, the elastic arms 124 can pass through the attaching hole, so as to be elastically restored or spread outward. As a result, the engagement surfaces 126*a* of the engagement claws 126 can elastically engage the inner periphery of the attaching hole of the body panel via the cushioning member 140 covering the engagement surfaces 126*a*, so that the anchor 110 can be connected to the body panel. Thus, the clip 101 can be attached to the body panel. As a result, the wiring harness previously coupled to the clip 101 can be attached to the body panel.

Similar to the first embodiment, according to the embodiment, the engagement surfaces 126*a* of the engagement claws 126 can respectively elastically engage the inner periphery of the attaching hole of the body panel with interleaving the cushioning members 140 therebetween. Therefore, even when the body panel has variations in thickness, such variations can be absorbed by elasticity (elastic deformation) of the cushioning members 140. Further, even when the attaching hole has variations in diameter caused by burrs formed therearound, such variations can be absorbed by elasticity of the cushioning members 140. Therefore, when the pillar 116 of the anchor 110 is inserted into the attaching hole, the engagement surfaces 126*a* of the engagement claws 126 can properly and stably engage the inner periphery of the attaching hole. As a result, the anchor 110 can be securely and stably connected to the body panel. Thus, the clip 101 can be reliably attached to the body panel.

Further, a substantial portion of the anchor 110 made of the hard resinous material may be uncovered except for the engagement surfaces 126*a* of the engagement claws 126 and the outer surfaces of the distal end portions 124*b* of the elastic arms 124 that are respectively covered by the cushioning members 140. In particular, the pillar 116 and substantial portions of the elastic arms 124 including the inclined surfaces 126*b* of the engagement claws 126 may be uncovered. That is, in the pillar 116 and the substantial portions of the elastic arms 124, the hard resinous material may be exposed or bared. Therefore, similar to the first embodiment, when the pillar 116 of the anchor 110 is inserted into the attaching hole formed in the body panel, a frictional resistance generated between the pillar 116 and the inner periphery of the attaching hole and between the elastic arms 124 (the inclined surfaces 126*b* of the engagement claws 126) and the inner periphery of the attaching hole can be prevented from being increased. As a result, an insertion load of the pillar 116 (the anchor 110) can be prevented from being increased.

As described above, when the pillar 116 of the anchor 110 is inserted into the attaching hole, the engagement surfaces 126*a* of the engagement claws 126 can elastically engage the inner periphery of the attaching hole of the body panel via the cushioning member 140. Therefore, in a condition in which the clip 101 is attached to the body panel, even if vibration caused by vehicle running motion is generated, such vibration can be effectively prevented from being transmitted to the elastic arms 124 (the anchor 110) by elasticity of the cushioning member 140. This may prevent generation of noise between the anchor 110 and the inner circumferential surface of the attaching hole.

Third Embodiment

Figure 13:
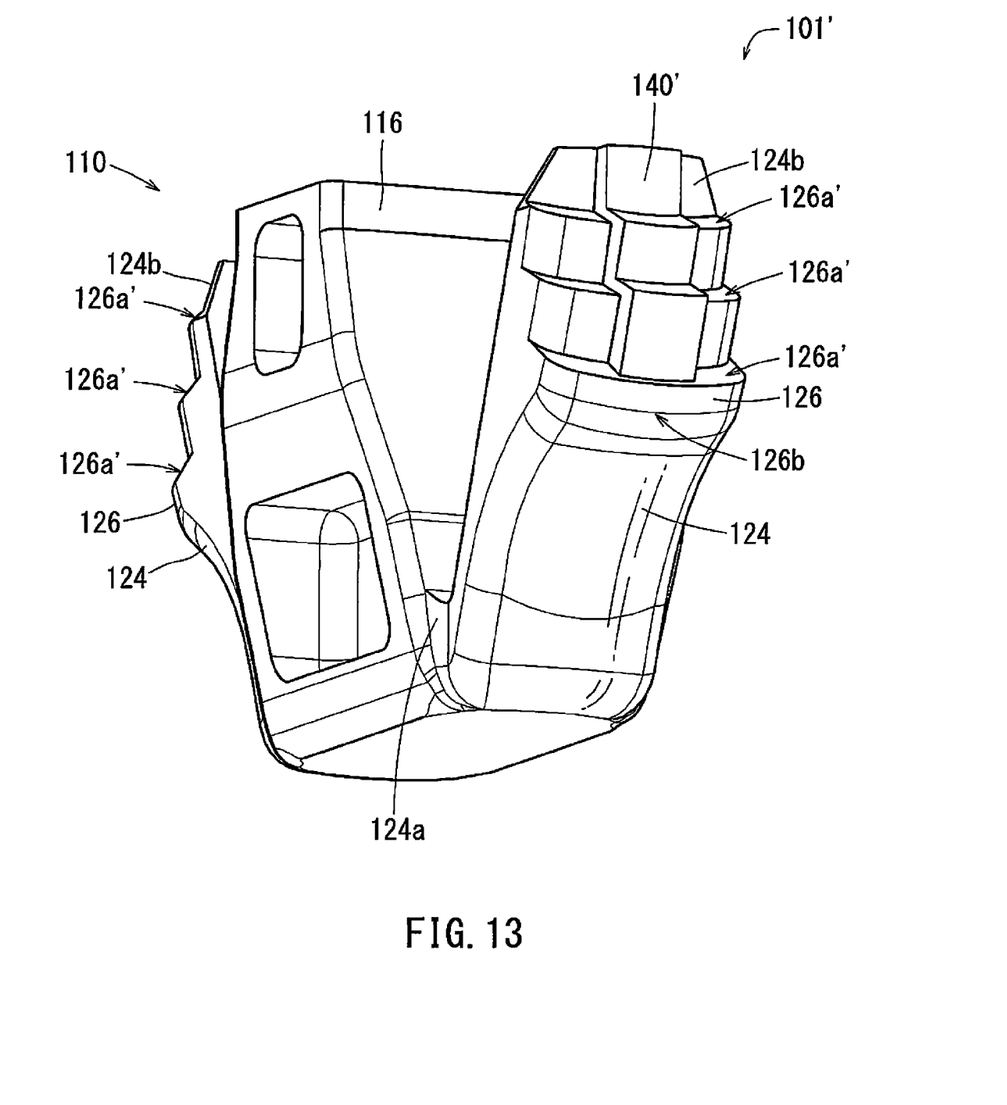
FIG. 13 is a perspective view of a clip according to a third representative embodiment of the present invention.

The third detailed representative embodiment will now be described in detail with reference to FIG. 13.

Because the third embodiment relates to the second embodiment, only the constructions and elements that are different from the second embodiment will be explained in detail. Elements that are the same in the first and second embodiments will be identified by the same reference numerals and a detailed description of such elements may be omitted.

In this embodiment, similar to the second embodiment, a clip 101' may have the substantially same structure as the clip 101 of the second embodiment with the exception of the engagement surfaces 126a of the engagement claws 126 and the cushioning member 140. In particular, unlike the second embodiment, each of the engagement claws 126 may have a plurality of (three in this embodiment) tiered engagement surfaces 126a' instead of the engagement surface 126a. As will be recognized, the tiered engagement surfaces 126a' may be formed as a plurality of shouldered surfaces formed in each of the distal end portions 124b of the elastic arms 124. Further, the clip 101' may include cushioning members 140' (which may be referred to as "cushions") instead of the cushioning members 140. Each of the cushioning members 140' may have a tiered shape that can substantially cover the plurality of tiered engagement surfaces 126a' of each of the engagement claws 126 and an outer surface of the distal end portion 124b of each of the elastic arms 124.

The clip 101' thus constructed may have the same effects as the clip 101 of the second embodiment. In addition, according to the clip 101', even when the body panel is varied in thickness, either one of the engagement surfaces 126a' of each of the engagement claws 126 can engage the inner periphery of the attaching hole. Therefore, the clip 101' can be reliably attached to body panels having various thicknesses.

Naturally, various changes and modifications may be made to the present invention without departing from the scope of the invention. For example, in the first embodiment, each of the engagement claws 26 respectively has the single engagement surfaces 26a. However, each of the engagement claws 26 may have a plurality of tiered engagement surfaces. Naturally, in this case, each of the cushioning members 40 may be shaped so as to cover the plurality of tiered engagement surfaces of each of the engagement claws 26.

Representative examples of the present invention have been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

What is claimed is:

1. A clip comprising:
    an anchor made of a hard resinous material and having a pillar that is configured to be inserted into an attaching hole formed in a plate-shaped object member and elastic arms that are formed in the pillar and capable of flexing inward and outward with respect to the pillar,
    cushions made of a soft resinous material, and
    a cushioning body made of the soft resinous material and integrally connected to the anchor,
    wherein the elastic arms respectively have engagement claws respectively having engagement surfaces that are configured to engage an inner periphery of the attaching hole,
    wherein the engagement surfaces are respectively covered by, and in engagement with, a portion of the cushions,
    wherein the cushions are integrally formed with the cushioning body,
    wherein the cushions covering the engagement surfaces of the engagement claws of the elastic arms are respectively continuous with the cushioning body via transition portions, and
    wherein each of the transition portions has an appropriate thickness such that each of the elastic arms cannot be prevented from being flexed with respect to the pillar.

2. The clip as defined in claim 1 further comprising additional cushions made of the soft resinous material, wherein an outer surface of the pillar is partially covered by the additional cushions.

3. The clip as defined in claim 2, wherein the additional cushions are integrally formed with the cushioning body.

4. The clip as defined in claim 3, wherein the anchor has a base integrally connected to a proximal end of the pillar, wherein the cushioning body is integrally connected to the anchor while the base is embedded in the cushioning body.

5. The clip as defined in claim 1, wherein the elastic arms have projections that are respectively formed in the engagement surfaces of the engagement claws, and wherein the cushions are respectively connected to the engagement surfaces while the projections are respectively embedded in the cushions.

6. The clip as defined in claim 1, wherein the elastic arms are respectively formed as cantilevered strips and respectively connected to a distal end of the pillar at proximal end portions thereof, and wherein the engagement claws are respectively formed in distal end portions of the elastic arms.

7. The clip as defined in claim 6, wherein each of the engagement surfaces is formed as a portion of an end surface of the distal end portion of each of the elastic arms.

* * * * *